United States Patent [19]

Wentworth

[11] Patent Number: 4,722,534
[45] Date of Patent: Feb. 2, 1988

[54] FACE SEAL WITH AUTOMATIC FACE CONVERGENCE MEANS

[75] Inventor: Robert S. Wentworth, Temecula, Calif.

[73] Assignee: Borg-Warner Industrial Products, Inc., Long Beach, Calif.

[21] Appl. No.: 810,137

[22] Filed: Dec. 18, 1985

[51] Int. Cl.$^4$ .............................................. F16J 15/34
[52] U.S. Cl. ........................................ 277/28; 277/27; 277/93 SD; 277/96.1; 277/1
[58] Field of Search .................... 277/27, 28, 81 R, 82, 277/83, 93 R, 93 SD, 96, 96.1

[56] References Cited

U.S. PATENT DOCUMENTS

| | | | |
|---|---|---|---|
| 3,297,329 | 1/1967 | Smith et al. | 277/28 X |
| 3,632,117 | 1/1972 | Villasor | 277/28 X |
| 4,114,900 | 9/1978 | Wiese | 277/27 |
| 4,212,475 | 7/1980 | Sedy | 277/96.1 |
| 4,230,324 | 10/1980 | Derman | 277/27 X |

*Primary Examiner*—Robert S. Ward
*Attorney, Agent, or Firm*—John W. Harbst; James J. Jennings

[57] ABSTRACT

A controllable mechanical seal for sealing a rotating body relative to a housing of a fluid device. The mechanical seal includes a pair of seal rings supported in juxtaposed relation in said housing. Each seal ring has a cylindrical outer surface and a radial end sealing face which, at a given operating condition of the machine, has a predetermined optimum convergence angle relative to the other seal ring face. The sealing faces are yieldably biased into contact with one another to define a dynamic seal there between. A seal ring support member is telescopically arranged about the outer cylindrical surface of one of said ring such that exposed surface area end regions of the cylindrical surface of the support ring are subjected to selectable differential pressures which cause the associated seal ring to distort thereby causing the seal face of the associated ring to assume a select angle of convergence relative to the seal face of the other seal ring. A sensor may be provided for automatically controlling the angle of convergence between the seal faces as a function of machine operation.

27 Claims, 3 Drawing Figures

FACE SEAL WITH AUTOMATIC FACE CONVERGENCE MEANS

FIELD OF THE INVENTION

This invention relates generally to a mechanical seal assembly for sealing a rotating body relative to a housing of a fluid machine in a manner preventing leakage of fluids from the housing. More particularly, it relates to a mechanical seal wherein the effectiveness of the sealant relationship between the two seal faces of the seal assembly may be modulated as a function of machine operation.

BACKGROUND OF THE INVENTION

Industry has used mechanical seals to replace packing as a means of sealing a rotary shaft or body passing through the wall of a vessel containing liquid or gas. As will be appreciated by those skilled in the art, a mechanical seal is basically formed of two elements or rings. One of the seal rings may be connected to the rotating body while the other ring is sealed to the housing. The radial end faces of the seal rings are arranged in an opposed relationship relative to one another and, thus, such seals are often referred to as end face seals. To allow for wear, at least one seal face may be spring loaded and axially movable relative the other seal face. In many applications, one of the seal faces is comprised of a softer self-lubricating material, such as carbon, while the other seal ring face will be a hard material, such as metal, ceramic, or metal carbide. Moreover, to accommodate high pressure applications, the faces of the seal rings are usually hydraulically balanced.

Because of the seal rings' relatively high cost, wear of the seal faces is an important consideration. Therefore, in recent years, many seal rings are designed such that both sealing faces are made from hard materials to accommodate more severe service. Because such hard materials are less yielding and have poor self-lubricating qualities, it is vital that a very thin lubricating fluid film, measurable in microinches, must be maintained between the seal faces.

The end face type seal has proven very effective and industry has widely adopted its use. Difficulties, however, have been encountered when end face type seals are used under high pressure and particularly under variable high pressures. Excessive leakage and erratic performance have been experienced even when the seals are manufactured with the highest possible manufacturing precision. As machine operating pressure increases, distortion of the seal rings can, and often does, result. Seal ring distortion, although measurable in only microinches, causes the lubricating fluid film between the seal rings to either collapse, resulting in zero film thickness, or such distortion causes the film to be too thick, thus causing leakage between the seal faces.

Tests have revealed a corrolation between fluid film thickness and the relative relationship of the seal faces. In particular, if the opposed seal faces are flat and parallel, the movable seal face will be urged into contact with and across the interface of the stationary or fixed seal ring. Consequently, the lubricating fluid film required therebetween will collapse resulting in zero film thickness and rapid seal wear. To prevent this from occuring, the opposing faces of the seal rings are specifically designed in a nonparallel relationship relative to one another. That is, the seal faces converge radially in the direction from the high pressure side to the low pressure side of the seal. By such construction, the pressurized product fluid has access to the convergent opening between the seal faces. The pressurized product fluid between the seal faces provides a sufficiently large opening force tending to move the resiliently mounted seal face away from the fixed seal face. The magnitude of this opening force will be a function of the size of the gap between the seal faces.

Because of the above, mechanical seals are often designed and manufactured with their sealing faces having a predetermined angle of convergence relative one another during steady state operation. As may be appreciated, heretofore conventional mechanical seals have been designed very carefully. In designing seals, it is the art of the seal designer to anticipate thermal and mechanical seal ring deformation and distortion, seal ring cross section, as well as width and balance of the faces to produce an acceptable film thickness under conditions of steady state operation. Additionally, seal designs are often specifically suited to predetermined operating conditions regarding temperature pressure, speed, load and fluid characteristics.

Today's industrial applications, however, vary considerably. Some applications often involve pumping unusual liquids which verge on being gases at similar densities. That is, the operating parameters of a pump regarding pressure speed, load and other considerations often changes. To accomodate such changing conditions, the faces and seal ring cross sections have to be repeatedly modified to adapt the pump to the particular operation. Even with carbon seal rings, such changes are costly. The rings made from the new and harder materials are even more expensive to modify and are far less forgiving of slight variations from optimum shape.

U.S. Pat. 3,275,330, issued to E. N. Rein on Sept. 27, 1966, discloses a face-type mechanical seal which is specifically designed to minimize distortion in a seal ring. To effect that end, the seal ring cross-section of the Rein device attempts to cancel any appreciable unbalance of forces which tend to distort the contacting seal faces out of a true flat condition. To achieve the desired cross-section is both a delicate and costly procedure.

Therefore, there remains a need in the art for a controllable seal wherein the fluid film thickness between the separated seal faces can be controlled despite seal ring deformation and without separate and specific design configurations for each pump operating condition. By accepting seal ring deformation and controlling same, the angle of convergence between the seal faces can be optimized for a wide range of operating conditions.

SUMMARY OF THE INVENTION

In line with the above, the present invention provides an end face mechanical seal for an apparatus having a body which rotates relative to a housing. The mechanical seal of the present invention includes a pair of seal rings having opposed seal faces which are urged into sealing relationship relative to one another to seal a high pressure fluid from a protected space. The seal faces of the rings, at a given operating condition of the machine, have a predetermined angle of convergence relative to one another. One of the rings is supported on its outer cylindrical surface, intermediate its radial end surfaces, by a seal ring support member. Unlike other mechanical seals, the present invention uses unbalanced forces for controlling the angle of convergence between the seal faces and thus the thickness of lubricating film therebetween. That is, by selectively arranging the support member in a predetermined lateral position on the outer cylindrical surface of one of the seal rings, the end portions or regions of the seal ring which are exposed to the pressurized pump product are subjected to differential pressures which cause the associated seal ring to distort. By selectively controlling the magnitude of seal ring distortion, the face orientation of the supported seal ring relative to the other seal ring face may be modulated in a manner thereby controlling the film thickness therebetween. Means may also be provided for monitoring the effectiveness of the seal and automatically controlling the angle of convergence as a function of the monitoring process.

In line with the above, a primary object of this invention is the provision of a more effective high pressure seal which will remain effective under variations in machine operating conditions.

Another object of this invention is to provide a mechanical seal assembly having a pair of seal rings, one of which is supported on unique structure which permits the angle of convergence between the seal faces of the rings to be modulated as a function of the seal's effectiveness.

A further object of this invention is the provision of a mechanical seal assembly having a pair of seal rings whose seal faces define a predetermined angle of convergence therebetween and wherein one of the seal rings are subjected to pressure differentials created by selectively controlling the affect of the machine product pressure in distorting the seal ring faces.

DESCRIPTION OF THE DRAWINGS

Having in mind the above objects and other attendant advantages that would be evident from an understanding of this disclosure, the invention comprises the devices, combination and arrangement of parts as illustrated in the presently preferred form of the invention which is hereinafter setforth in detail to enable those skilled in the art to readily understand the function, operation, construction and advantages of same when read in conjunction with the accompanying drawings in which.

DETAILED DESCRIPTION OF THE PREFERRED EMBODIMENT

Figure 1:
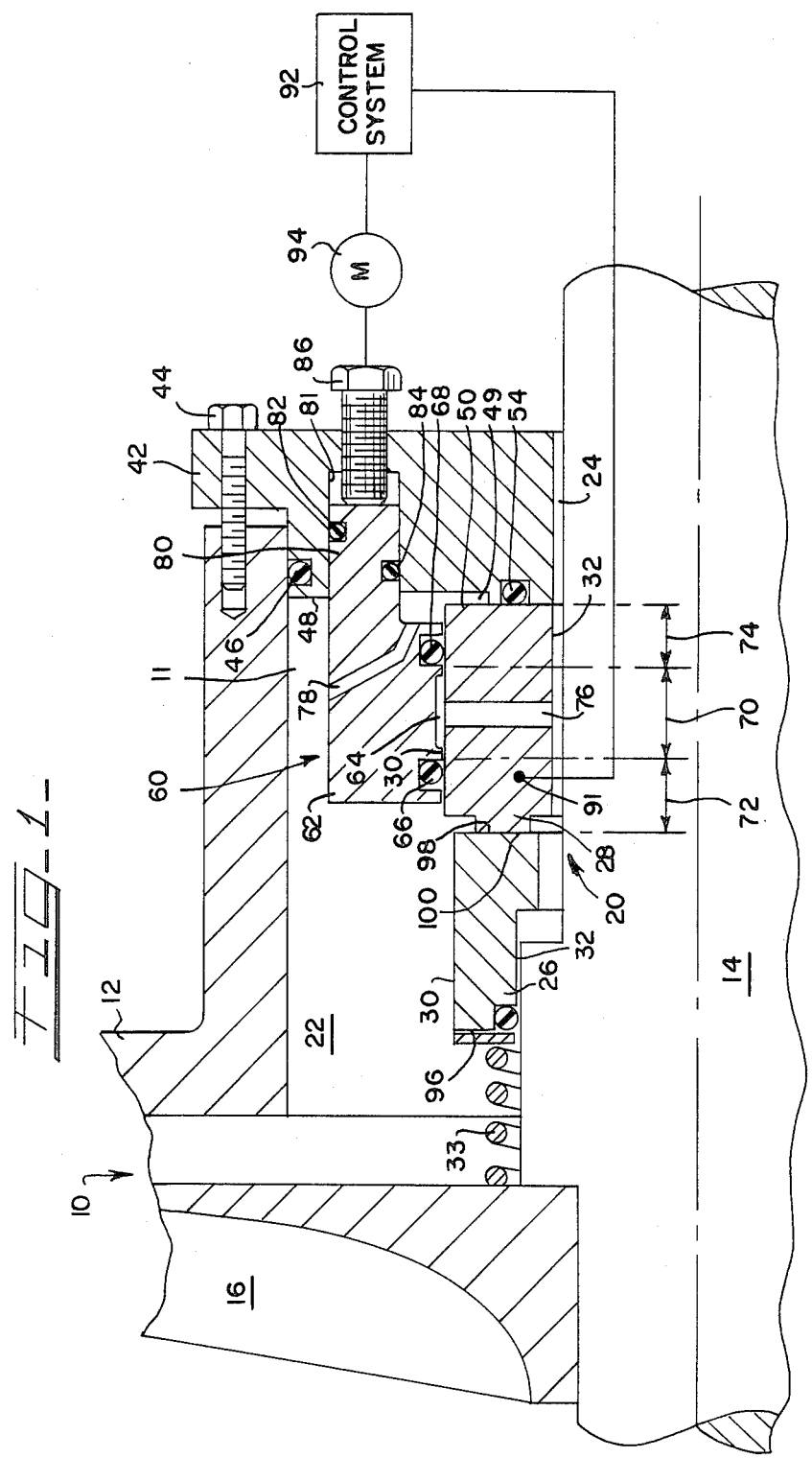
FIG. 1 is a partial longitudinal sectional view of an improved mechanical seal constructed in accordance with the principles of the present invention.

Referring now in detail to the drawings, wherein like reference numerals indicate like parts throughout the several views, in FIG. 1, there is schematically illustrated a pump assembly 10. While the drawings illustrate application of the present invention to a pump assembly, it will be appreciated that the general teachings of the invention equally apply to other types of fluid machinery. For purposes of simplicity, only a portion of the pump 10 has been illustrated. Suffice it to say, the pump or fluid machine includes a chambered housing 12 which is penetrated by a shaft 14. One end of the shaft 14 passes through an opening 11 in the housing 12 and is rotatably driven relative to the housing 12 by a motor (not shown), or other suitable means, operably connected to one end of the shaft. The other end of the shaft 14 has an impeller 16 connected thereto. The impeller is enclosed in a chamber of the housing wherein a pressurized fluid flow is created as a result of impeller action.

Referring to FIG. 1, the controllable mechanical seal 20 of the present invention is constructed and arranged to substantially retard passage of pumped fluid from a high pressure environment to a low pressure environment while concurrently permitting the shaft to rotate with respect to the housing. That is, the seal assembly of the present invention provides an essentially fluid-tight dynamic seal which restrains the passage of pump product between a first zone or area 22 wherein there exists elevated pressures and a second zone or area 24 wherein relatively low pressure exists and which extends along the shaft and may be open to atmosphere or environment surrounding said housing.

In the illustrated embodiment, the mechanical seal assembly 20 includes a pair of coaxially mounted seal rings 26 and 28 arranged in juxtaposed relation and which surround the shaft 14. The seal rings are preferably constructed of silicon or tungsten carbide. The outside cylindrical surface 30 of each ring is exposed to the pressure media being sealed while the inner cylindrical surface 32 is exposed to the protected space fluid. Seal ring 26 is shown to be rotatable with and sealed to the shaft, while seal ring 28 is shown to be nonrotating or relatively stationary. Any suitable means (not shown) may be provided in conjunction with the non-rotating seal ring to resist torque imparted thereto by the rotating element. It should be understood, however, that either element or ring could be rotatable with the other being nonrotatable. Similarly, while ring 26 is schematically illustrated to be floating or resiliently biased as seen in FIG. 1 by a resilient member or spring 33 and ring 28 is shown to be fixed, either could be the floating or movable ring, with the other being fixed.

In the illustrated embodiment, an apertured closure plate 42, fabricated of easily machineable metal material, is affixed to the open end of the pump housing behind the seal ring 28 by means of suitable, circularly arranged fasteners 44. The annular space between the closure plate 42 and the pump casing or housing 12 is sealed by means of an O-ring 46 seated in a suitable groove. The end surface 48 of the closure plate 42 is stepped to provide an annular chamber 49 behind the radial end surface 50 of the seal ring 28; the chamber 49 being arranged in fluid communication with the high pressure media in chamber 22 of the housing. An O-ring 54, disposed in a suitable groove, is provided in the stepped portion of the closure plate 42 to seal the plate 42 to the seal ring 28 thus preventing the passage of pressurized pump product thereby. By such construction, a portion of radial end surface 50 of seal ring 28 is exposed to the high pressure fluid in chamber 22 and thus the net axial pressure affect on the seal ring 28 is extremely low. By providing the groove for the O-ring 54 in the easily machineable material of the closure plate 42, the net axial pressure on the seal ring 28 may be controlled as a function of the radial dispostion of the O-ring 54 relative to the outside diameter of the seal ring.

In the illustrated embodiment, a seal ring support assembly 60 is associated with the stationary seal ring 28. It will be appreciated, however, that with slight modification the seal ring carrier assembly could be associated with the other or both of the seal rings. The seal ring support assembly 60 includes a seal ring carrier element 62 which is mounted for movement relative to the end plate 42. The free-end of the carrier element 62 is formed as a cylindrical member or housing which is telescopically arranged about the outside cylindrical surface of the seal ring which is carried thereby. The outer cylindrical surface 30 of the supported seal ring defines with or capacity of which is defined by a spaced pair of O-rings 66 and 68. The cavity 64 operatively divides or separates the outer cylindrical surface 30 of the supported ring into three sections; namely a medial section 70 defined by the lateral width of the cavity 64 and two end portions or regions 72 and 74 outwardly extending from the medial region to the respective radial end surface of the supported seal ring. A radial passageway 76 extends through and permits communication of the cavity or chamber 64 with the protected space fluid. As a skilled artisan will appreciate, alternative structure could be provided to communicate the chamber 64 with the protected space fluid. In the illustrated embodiment, the radial passageway 76 extends substantially through the centroid of the seal ring cross section. The cylindrical bracket or housing 62 is provided with one or more radial passages 78 which permit exposure of the end portion 74 of the supported seal ring to the high pressure media. Moreover, the passageway 78 allows fluid communication between annular chamber 49 and the high pressure media for purposes described above.

The seal ring carrier element 62 is mounted for lateral shifting movement relative to the supported seal ring. To effect these ends, an annular groove 81 provided in plate element 42. The inside and outside diameters of the extension are sealed to the plate 42 by sealant means 82 and 84, respectively. The sealant means 82 and 84 comprise suitable o-rings. Separate keys or pins (not shown) may engage the element 62 to prevent it from rotating. Three or more operator accessible regulating screws 86 are disposed in equally spaced locations about the plate 42 for positioning the carrier 62. Linear displacement of the regulating screws 86 ultimately result in lateral displacement of the seal ring carrier 62 and thereby a change in the lateral disposition of the cavity 64 relative to the supported seal ring. A change in the lateral position of cavity 64 will result in a change in the exposed surface ratio of the end portions 72 and 74.

As schematically illustrated in FIG. 1, sensing or monitoring means 91 may be suitably embedded in one of the seal rings. The sensing means 91 provides an output signal indicative of various parameters such as temperature, pressure and leakage in the area of the seal faces. A control system 92 is responsive to the output of the sensor means 91 and develops a response thereto when the monitored effect of the seal ring is different from established predetermined expectancies. The response of the control system effects or actuates a motor 94 which, in turn, is operably connected to the regulating screw 86 to effect the lateral disposition of member 62.

Figure 2:
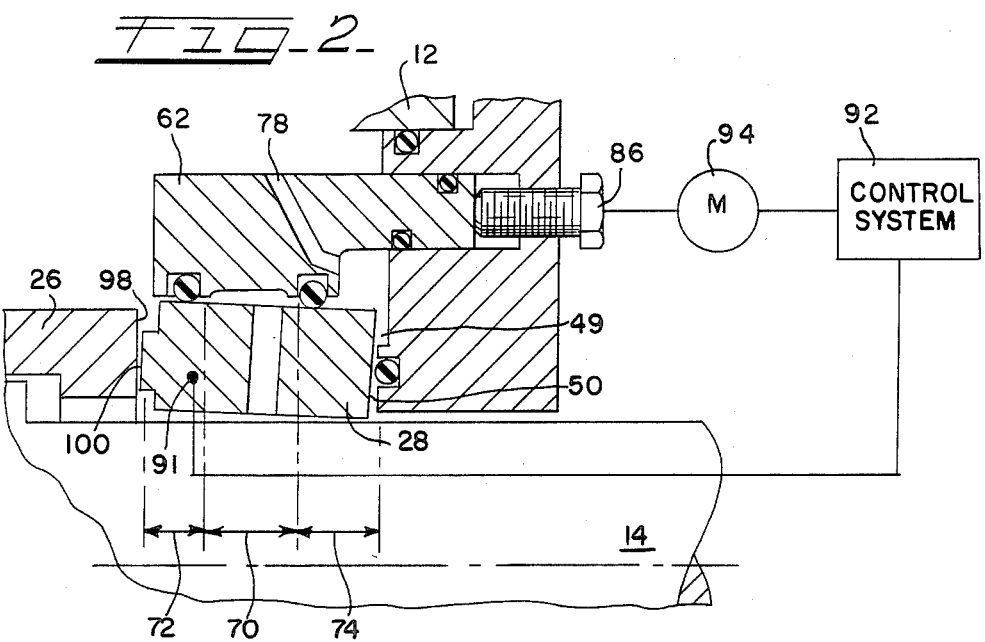
FIG. 2 is an enlarged cross-sectional view schematically illustrating the present invention in one mode of operation.
Figure 3:
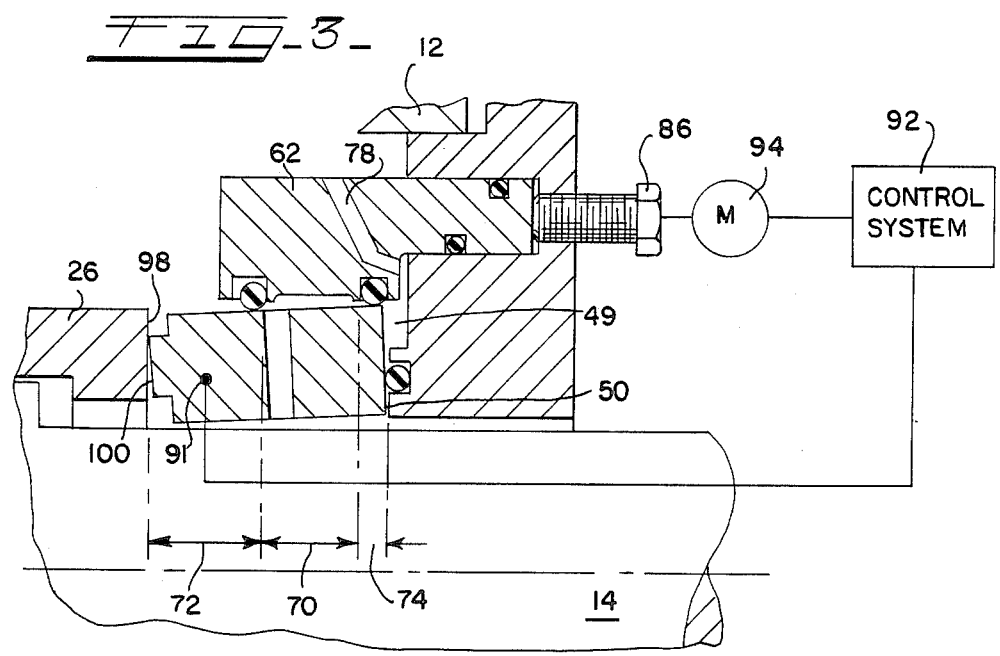
FIG. 3 is a cross-sectional view similar to FIG. 2 and schematically illustrating the present invention in another mode of operation.

A discussion of the operation of the controllable mechanical seal 20 will now be described with reference to FIGS. 2 and 3. Each seal ring has opposed radial end faces. Specifically, seal ring 26 has radial end faces 96 and 98 (FIG. 1) while seal ring 28 has radial end faces 100 and 50. As is evident from the drawings, the lapped seal end faces 98 and 100 are biased together to establish the dynamic seal therebetween. Depending on pump operation, the seal faces 98 and 100 have a predetermined angle of convergence relative to one another. Assuming that the high pressure media is restrained to the outer diameter of the seals and the protected fluid area is on the inner diameter, the seal surfaces 98 and 100 may converge from the outer diameter to the inner diameter as illustrated in FIG. 2 or in the opposite extreme as illustrated in FIG. 3 depending on various conditions. It will be appreciated that the illustrated angles of convergence and tipping of the supported seal ring have been exaggerated for purposes of illustration. The actual movement of the seal face is on the order of $1 \times 10 - 5$ inches.

Being disposed in the pressurized environment of a fluid machine, the outer diameter of the seal rings will have fluid forces acting thereon. Besides the fluid force applying inwardly directed force components to the outside diameter of the seal ring in a direction extending substantially perpendicular to the center line of the shaft 14, the axially directed force components are applied to the end faces of the seal rings by the pressurized medium. The axially directed fluid forces acting on the seal rings 26 and 28 includes closing forces applied to the radial end surfaces 96 (FIG. 1) and 50, respectively, which tend to urge the rings toward one another and opening forces which are applied to the radial end surfaces 98 and 100, respectively, tending to urge these elements apart from one another. The resilient biasing force of spring 33 (FIG. 1) is negligible as compared with the magnitude of these fluid forces. During steady state operation of the fluid machine, the net opening and closing forces must substantially balance one another for the system to be in equilibrium. Although the sealant means of the invention may be considered essentially fluid-tight, a successful mechanical seal has a thin lubricating film between the seal faces 98 and 100. The thickness of this film must be large enough to reduce wear and/or seizure of the rings, but small enough to prevent excessive leaksage. The resultant force balance between the rings determines the thickness of this fluid film.

Assuming that machine 10 is operating in stable condition, the angle of convergence between the surfaces will correspond to some film thickness having an optimum value for this particular operating condition. The predetermined angle of convergence may remain substantially constant when the opening and closing force vectors applied by the pressurized fluid remain in equilibrium. If there is a change in some operating condition, such as start up, shut down, speed change during operation, temperature variation, pressure changes, change in the characteristics of the particular fluid used in the machine and the like, the effectiveness of the seal may change. This change in the effectiveness of the seal may be sensed by the monitoring means 91. As a result, the control means 92 causes actuation of the motor 94 thereby effecting a change in the lateral disposition of the seal ring carrier 62 relative to the supported seal ring.

As described above, the lateral disposition of the seal ring carrier relative to the supported seal ring determines the exposed surface area ratio of one end portion 72 relative to the other end portion 74. That is, the selected lateral disposition of the seal ring carrier 62 relative to the supported seal ring determines the pressure differential which may be applied to the supported seal ring and thereby provides a desired degree of deflection of the sealing surface of the associated seal ring.

Should the seal ring carrier be disposed in the position shown in FIG. 2, the resultant of the external forces applied to the supported seal ring will theoretically create or apply a force vector directed substantially perpendicular to the axis of rotation and against the exposed surface area of end portion 74 which lies to the right of the seal ring centroid. The other exposed end portion 72 having a lesser exposed surface area, will have a proportionately lesser force vector applied thereto. Seal ring end portion 74 having a greater exposed surface area will accordingly respond to such a radially directed resultant force by rotation of that section around the seal ring centroid. Such action causes distortion or deflection of the seal ring and thereby modulation of the disposition of the contact face 100 and thereby the angle of convergence between the seal faces. Of course, if the seal ring carrier 58 is shifted in the opposite direction such that a resultant force is moved to the opposite side of the seal ring centroid, the ring will distort or deflect in a different manner thereby moving the contact face 100 into a different convergent relationship with the other seal ring face. Understandably, if the clockwise and counterclockwise moments applied to the end portions of the supported ring are in balance, there is no tendency for the end sections 72 and 74 to rotate and thus the surfaces 100/96 may assume contact across their entire width if such is desired for the particular operation. By such construction, the angle of convergence between the seal faces may be modulated either automatically or manually, as a function of pump operation.

Thus, there has been provided an IMPROVED MECHANICAL SEAL which fully satisfies the objects, aims and advantages setforth above. While the invention has been described in connection with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

Thus, having adequately described my invention, what I claim is:

1. In combination with a fluid device, a controllable mechanical seal which permits rotation of a body relative to a fixed housing and seals a high pressure fluid from a protected space of relatively low pressure, said controllable seal comprising:

a pair of seal rings, each seal ring being arranged generally coaxial relative to the other and having inner and outer cylindrical surfaces and radial end surfaces, with the outer cylindrical surfaces being exposed to the high pressure fluid:

an annular seal face on an end surface of each ring, said seal faces being opposed and urged into a sealing relationship with one another such that, under given operating conditions, the seal faces have a predetermined converging angle existing therebetween;

a second annular surface on another end surface of each seal ring, the second annular surfaces being opposed and spaced from each other;

operative means for operably supporting at least one of said seal rings, said operative means comprising a cylindrical member telescopically arranged about said supported seal ring and having a spaced pair of elastomeric rings disposed between the outer cylindrical surface of said supported seal ring and the adjacent cylindrical wall of said cylindrical member for establishing a chamber about a portion of the cylindrical surface of said supported seal ring, the spacing between said elastomeric members being such that end portions extending from opposite sides of said chamber, are created on the outer cylindrical surface of said supported seal ring, said end portions being exposed to the pressurized fluid being sealed; and means for modulating the disposition of said cylindrical member relative to said outer cylindrical surface of said supported seal ring such that any desired pressure differential can be created on the exposed end portions as a function of cylinder member modulation.

2. The invention according to claim 1, wherein said chamber is fluidically connected to the protected space of relatively low pressure.

3. The invention according to claim 1, wherein means are provided on said cylinder member for exposing said second annular surface of said supported seal ring to the high pressure fluid to modify the axial hydraulic load on said supported seal ring seal face.

4. The invention according to claim 1, wherein both of said rings are fabricated from tungsten carbide.

5. A mechanical seal assembly for a pressurized fluid apparatus having a housing and a body adapted for rotation relative to said housing, said mechanical seal assembly comprising:

a first seal ring operably coupled to said body and having a cylindrical outer surface;

a second seal ring operably supported in said housing such that it surrounds said body and has a cylindrical outer surface with an annular radial sealing surface confronting a radial meeting sealing surface on said first seal ring, said surfaces, at a given operating condition, having a predetermined angle of convergence relative one another;

resilient mechanical force means for urging said surfaces into contact; and seal ring support means associated with said second seal ring for permitting selective modulation of the angle of convergence between said surfaces by exposing opposite and spaced end portion surface areas of the supported second seal ring's cylindrical outer surface to differential pressures.

6. The invention according to claim 5, wherein said seal ring support means includes a cylindrical housing arranged about said second seal ring and having means for separating the exposed end portion surface areas by a medial section which is not exposed to the pressurized fluid to the apparatus.

7. The invention according to claim 6, wherein said seal ring support means includes means for regulating the lateral disposition of said cylindrical housing and thereby said separating means to modulate the exposed end portion surface area ratio.

8. The invention according to claim 7, wherein said means for regulating includes operator accessible means which permit movement of said cylindrical housing with said separating means relative to the supported seal ring during operation of the apparatus.

9. The invention according to claim 5, wherein the pressurized fluid of the apparatus is the media used in applying the differential pressures to said end portion surface areas.

10. A mechanical seal assembly for retarding fluid flow between high and low pressure regions of an apparatus, said apparatus having a housing and a shaft adapted for rotation relative to said housing, said mechanical seal assembly comprising:

first and second seal rings supported in juxtaposed relation in said housing with one seal ring being operably sealed and fixed to said shaft and other seal ring being operably sealed to said housing, each seal ring having inner and outer cylindrical surfaces and radial end surfaces, with the outer surface of each ring being exposed to the high pressure region of said apparatus;

an annular seal face on one end surface of each ring, said seal faces being opposed and in sealing relation with one another and, at a given operating condition, having a predetermined angle of convergence relative to one another; and operative means operably associated with one of said seal rings for permitting spaced end regions of the outer cylindrical surface of said associated ring to be subjected to differential pressures thereby causing the seal face of said associated ring to assume a selective angle of convergence relative the seal face of the other seal ring.

11. The mechanical seal assembly according to claim 10, wherein said operative means includes supported cylindrical bracket means situated about said associated seal ring with a spaced pair of elastomeric means disposed between said bracket means and the outer cylindrical surface of said ring, the distance between said elastomeric means and the radial end surfaces of the ring defining the end regions which are subjected to differential pressures.

12. The invention according to claim 11, wherein said bracket means, along with said elastomeric means, are laterally movable along the outside cylindrical surface of said associated seal ring to control surface area exposure ratio of said end portions.

13. The invention according to claim 12, wherein said pressure differentials are directly related to the exposed surface area ratio of said end portions.

14. The invention according to claim 10 further including means for equalling axial hydraulic loads applied to said associated seal ring as a result of radial end surface exposure to the high pressure fluid.

15. In combination, a housing defining a chamber for the reception of fluid under pressure, a shaft in the chamber, said housing having an opening through which the shaft extends to the exterior of the housing, and a controllable mechanical seal for effecting a fluid-tight seal between the shaft and housing, said seal comprising:

a rotating element operably sealed to said housing and having a first radial end face surface;

a nonrotating element operably sealed to said shaft and having a second radial end face surface;

one of said elements being resiliently urged to forcibly move said radial end surfaces into sliding contact relative one another, said first and second end face surfaces defining an angle of convergence therebetween which extends between the high and low pressure sides of said seal and within which there is a thin lubricating fluid film;

means for supporting at least one of said elements such that separated surface end portions of the supported element are exposed to predeterminable differential pressures which controllably distort the supported seal ring whereby causing the radial end face surface thereof to assume a predeterminable angular disposition with respect to the radial end surface of the other seal ring; and means for modulating the differential pressures applied to said surface end portions thereby effecting the angle of convergence between said end surfaces.

16. The invention according to claim 15, wherein said modulating means includes sensor means for monitoring seal performance and means responsive to said sensor means for regulating the differential pressures applied to said end portions.

17. A mechanical seal assembly which permits rotation of a body relative to a stationary housing while restraining the flow of a pressurized medium between a high pressure zone and a relatively low pressure zone, said mechanical seal assembly comprising:

a pair of seal rings arranged in said housing and whose outer diameters are exposed to the medium in the high pressure zone, with each seal ring having a radial end sealing face which, at a given operating condition, has a predetermined converging angle relative the other seal ring and wherein said rings are resiliently biased into contact with one another to define a dynamic seal therebetween, said dynamic seal serving to separate the high and low pressure regions; and seal ring support means associated with one of said seal rings for permitting selective modulation of the radial end sealing face disposition by exposing end portions of the outer diameter of said associated seal ring to differential pressures causing distortion of the seal ring and thereby effecting the angle of convergence between the sealing faces.

18. The invention according to claim 17, wherein said pair of seal rings are fabricated from silicon carbide.

19. In combination with a fluid machine having a chambered housing for receiving fluid under pressure, a rotatable shaft in the chamber, said machine having an opening through which said shaft extends to the exterior of the machine, and a rotary mechanical seal for effecting a seal between the shaft and the machine housing, said seal comprising:

a first sealing annular element adapted for rotation with and operably sealed to the shaft;

a second sealing annular element arranged adjacent the first sealing element, said first and second elements having opposed radially extending sealing end surfaces which, under given operating conditions, have a predetermined converging angle existing therebetween and which are urged together under a resilient biasing force; and operative means for supporting and sealing said second annular sealing element relative to the housing, said operative means establishing a chamber about the periphery of said supported element intermediate exposed outer end portions and which is closed to the pressurized fluid, such that the pressure in said chamber is different from the pressure exerted on the exposed outer end portions of said supported sealing element by the fluid under pressure, the surface area ratio between said exposed outer end portions establishing the disposition of the sealing end surface of the supported seal ring and thereby the angle of convergence between the seal faces.

20. The invention according to claim 19, wherein said operative support means includes support structure disposed in the pressurized fluid chamber, and a spaced pair of elastic rings disposed between the supported sealing element and said support structure establishing said chamber about the periphery of said supported sealing element.

21. The invention according to claim 20, wherein means are provided for laterally shifting said support structure with said elastic rings along the periphery of said supported sealing element to change the exposed surface area ratio of the end portions.

22. The invention according to claim 21, wherein means are provided for monitoring the effectiveness of said sealing elements and for controlling the lateral disposition of said chamber relative to said housing as a function of the monitored effectiveness of the sealing elements.

23. The invention according to claim 21, wherein sensor means capable of detecting changes in the operating condition of the fluid machine are provided for controlling the lateral disposition of said chamber relative to said supported sealing element when the performance of the seal assembly changes.

24. A method of sealing a rotating shaft penetrating a housing of an apparatus against egress from said housing of a fluid under high variable pressure, said method comprising the steps of:

providing a first seal ring which is secured and operably sealed to said housing and coaxial with said shaft;

providing a second seal ring surrounding said shaft, each of said seal rings having an outside cylindrical surface exposed to said pressurized fluid and radial end surfaces, an annular seal face on one end surface of each seal ring, said seal faces opposing and arramged in sealing relationship with one another and, at a given operating condition, having a predetermined angle of convergence relative one another;

urging said seal faces into contact by the application of resilient mechanical force whereby creating a dynamic seal therebetween which restrains the egress of fluid thereby;

supporting one of said seal rings by its outside cylindrical surface and at a location intermediate the radial end surfaces thereof such that spaced end portion surface areas of the outside cylindrical surface of said supported ring are each subjected to the high variable pressure of the fluid restrained against egress from said housing.

25. The method of sealing a rotating shaft penetrating a housing according to claim 24, further comprising the step of:

selecting the end portion surface area exposure ratio such that an optimum angle of convergence between the seal faces may be achieved as a function of the pressure differential applied to the exposed end portion surface areas by the restrained fluid under pressure.

26. The method of sealing a rotating shaft penetrating a housing according to claim 25, further comprising the steps of:

monitoring the seal performance and developing a signal reflective of such performance; and controlling the selected end portion surface area exposure ratio in response to the signal developed during the monitoring process.

27. The method of sealing a rotating shaft penetrating a housing according to claim 25, further comprising the steps of:

monitoring the seal performance;

controlling the selected end portion surface area exposure ratio in response to the conditions monitored in the previous monitoring process.

* * * * *